US012527497B2

(12) United States Patent
Russo

(10) Patent No.: US 12,527,497 B2
(45) Date of Patent: Jan. 20, 2026

(54) DETECTING REINSERTION OF A CONTINUOUS GLUCOSE MONITORING SENSOR

(71) Applicant: Ascensia Diabetes Care Holdings AG, Basel (CH)

(72) Inventor: Anthony P. Russo, New York, NY (US)

(73) Assignee: Ascensia Diabetes Care Holdings AG, Basel (CH)

( * ) Notice: Subject to any disclaimer, the term of this patent is extended or adjusted under 35 U.S.C. 154(b) by 29 days.

(21) Appl. No.: 17/374,887

(22) Filed: Jul. 13, 2021

(65) Prior Publication Data

US 2022/0015670 A1    Jan. 20, 2022

Related U.S. Application Data

(60) Provisional application No. 63/051,862, filed on Jul. 14, 2020.

(51) Int. Cl.
*A61B 5/00* (2006.01)
*A61B 5/145* (2006.01)

(52) U.S. Cl.
CPC ........ *A61B 5/14532* (2013.01); *A61B 5/0002* (2013.01); *A61B 5/14503* (2013.01); *A61B 2560/028* (2013.01); *A61B 2562/08* (2013.01)

(58) Field of Classification Search
CPC .............. A61B 5/14532; A61B 5/0002; A61B 5/14503; A61B 2560/028; A61B 2562/08
See application file for complete search history.

(56) References Cited

U.S. PATENT DOCUMENTS

| 8,301,395 | B2 | 10/2012 | Matievich et al. |
| 2007/0203547 | A1* | 8/2007 | Costello ................. A61N 1/056 607/59 |

(Continued)

FOREIGN PATENT DOCUMENTS

| EP | 1972269 A1 | 9/2008 |
| EP | 3243434 A1 | 11/2017 |

(Continued)

OTHER PUBLICATIONS

U.S. Appl. No. 17/374,897, filed Jul. 13, 2021, Russo.

(Continued)

*Primary Examiner* — Alex M Valvis
*Assistant Examiner* — Grace L Rozanski
(74) *Attorney, Agent, or Firm* — Erise IP, P.A.

(57) ABSTRACT

A continuous glucose monitoring (CGM) system is configured to detect a reinserted CGM sensor. The system reads a CGM sensor identifier stored in a CGM sensor unit memory in response to insertion of a CGM sensor into the skin of user. The system compares the identifier to any previously-stored identifiers of previously-inserted CGM sensors. If the identifier does not match a previously-stored identifier, indicating a newly-inserted sensor, the identifier is stored and CGM may begin. If the identifier matches a previously-stored identifier, indicating a reinserted sensor, a usage limit corresponding to the stored identifier of the reinserted sensor is then checked to determine whether it has been met. If it has, CGM is halted. If it has not, CGM may continue with the reinserted CGM sensor. Methods of detecting reinsertion and usage limits of a CGM sensor are also provided, as are other aspects.

21 Claims, 5 Drawing Sheets

(56) References Cited

U.S. PATENT DOCUMENTS

| | | | |
|---|---|---|---|
| 2010/0275108 A1* | 10/2010 | Sloan | A61B 5/14532 714/E11.002 |
| 2011/0172942 A1* | 7/2011 | Al-Ali | G07C 3/00 250/214 R |
| 2013/0245981 A1* | 9/2013 | Estes | A61B 5/7203 702/87 |
| 2014/0379358 A1 | 12/2014 | Chovanda et al. | |
| 2015/0351673 A1* | 12/2015 | Vanslyke | A61M 5/1723 600/301 |
| 2016/0335409 A1* | 11/2016 | Mensinger | G16H 10/60 |
| 2017/0055896 A1* | 3/2017 | Al-Ali | A61B 5/68335 |
| 2017/0234858 A1* | 8/2017 | Depa | B01L 3/52 436/165 |
| 2019/0190913 A1* | 6/2019 | Love | A61B 5/1451 |
| 2019/0260748 A1* | 8/2019 | Leleu | G06V 40/1365 |
| 2021/0085225 A1* | 3/2021 | Park | A61B 5/0002 |

FOREIGN PATENT DOCUMENTS

| | | |
|---|---|---|
| JP | 2003521985 | 7/2003 |
| JP | 2008506468 A | 3/2008 |
| WO | 2015100109 A1 | 7/2015 |
| WO | WO2017069867 A1 | 4/2017 |
| WO | 2021029509 | 2/2021 |

OTHER PUBLICATIONS

International Search Report of International Application No. PCT/EP2021/069303 mailed Oct. 22, 2021.
Taiwan Patent Application 110125794 Official Action issued Sep. 2, 2024.
Japanese Patent Application 2023-501794, First Office Action, issued Mar. 18, 2025.

* cited by examiner

500A

| IDENTIFIER | USAGE LIMIT | USAGE COUNT |
|---|---|---|
| 12345678 | 4,032 | 4,032 |
| 87654321 | 2,880 | 2,880 |
| 43218765 | 4,032 | 4,032 |
| ⋮ | ⋮ | ⋮ |

| IDENTIFIER | USAGE LIMIT | USAGE COUNT |
|---|---|---|
| 46813527 | 4,032 | 0 |
| 12345678 | 4,032 | 4,032 |
| 87654321 | 2,880 | 2,880 |
| ⋮ | ⋮ | ⋮ |

| IDENTIFIER | USAGE LIMIT | USAGE COUNT |
|---|---|---|
| 46813527 | 4,032 | 3,679 |
| 12345678 | 4,032 | 4,032 |
| 87654321 | 2,880 | 2,880 |
| ⋮ | ⋮ | ⋮ |

*FIG. 5C*

DETECTING REINSERTION OF A CONTINUOUS GLUCOSE MONITORING SENSOR

CROSS REFERENCE TO RELATED APPLICATION

This claims the benefit of U.S. Provisional Patent Application No. 63/051,862, filed Jul. 14, 2020, the disclosure of which is hereby incorporated by reference herein in its entirety for all purposes.

FIELD

The invention relates generally to continuous glucose monitoring (CGM).

BACKGROUND

CGM has become a routine monitoring operation in diabetes care. By providing real-time glucose readings, therapeutic actions may be applied in a more timely fashion and a glycemic condition may be better controlled. During a CGM operation, a sensor of a CGM device is typically inserted subcutaneously and is continuously operated in an environment surrounded by tissue and interstitial fluid. The sensor inserted under the skin of a user provides a signal to a wireless transmitter unit of the CGM device that is indicative of the user's glucose level. Glucose readings may be performed automatically many times throughout the day (e.g., every few minutes or at some other pre-established time interval).

The CGM device may adhere to the outer surface of a user's skin, such as on the abdomen or the back of the upper arm, while the sensor is inserted through the skin to contact interstitial fluid. The sensor interacts with the interstitial fluid, generating electrical signals that are proportional to the amount of glucose present. These electrical signals are communicated to the transmitter unit for use in glucose level determinations.

The CGM device may be worn on the body for several days or even several weeks before removal and replacement of the sensor is required. Sometimes, a sensor may need to be removed and reinserted, e.g., to attend to a problem with adherence of the CGM device to the user's skin.

SUMMARY

In some embodiments, a continuous glucose monitoring (CGM) system is provided that includes a sensor unit having a sensor unit memory and a sensor, wherein the sensor unit memory has an identifier stored therein. The CGM system also includes a second memory configured to store therein a plurality of sensor identifiers. The CGM system further includes a processor in communication with the second memory and the sensor unit. The processor is configured to execute computer instructions to (1) read the identifier stored in the sensor unit memory; (2) determine whether the identifier matches any previously-stored identifier in the second memory; (3) store the identifier in the second memory in response to the identifier not matching any previously-stored identifier in the second memory; and (4) determine whether the sensor has met a predetermined usage limit in response to the identifier matching a previously-stored identifier in the second memory.

In some embodiments, a continuous glucose monitoring (CGM) system is provided that includes a sensor configured to be inserted into skin of a user and to generate electrical signals indicative of a glucose level. The CGM system also includes a first memory having an identifier stored therein identifying the sensor, a second memory configured to store therein a plurality of sensor identifiers, and a processor in communication with the first and second memories. The processor is configured to execute computer instructions to (1) read the identifier stored in the first memory; (2) determine whether the identifier matches any previously-stored identifier in the second memory; (3) store the identifier in the second memory in response to the identifier not matching any previously-stored identifier in the second memory; and (4) determine whether the sensor has met a predetermined usage limit in response to the identifier matching a previously-stored identifier in the second memory.

In some embodiments, a method of detecting reinsertion of a continuous glucose monitoring (CGM) sensor is provided. The method includes reading an identifier of the sensor from a sensor unit memory via a processor executing computer instructions in response to activation of CGM; determining whether the identifier matches any previously-stored identifier in a second memory; storing the identifier in the second memory in response to the identifier not matching any previously-stored identifier in the second memory; determining whether the sensor has met a predetermined usage limit in response to the identifier matching a previously-stored identifier in the second memory; and stopping operation of the CGM in response to determining that the sensor has met its predetermined usage limit.

Still other aspects, features, and advantages of this disclosure may be readily apparent from the following detailed description and illustration of a number of example embodiments and implementations, including the best mode contemplated for carrying out the invention. This disclosure may also be capable of other and different embodiments, and its several details may be modified in various respects, all without departing from the scope of the invention. For example, although the description below is related to continuous glucose monitoring, the devices, systems, and methods described below may be readily adapted to monitoring other analytes, such as, e.g., cholesterol, lactate, uric acid, alcohol, or the like, in other continuous analyte monitoring systems. This disclosure is intended to cover all modifications, equivalents, and alternatives falling within the scope of the appended claims (see further below).

BRIEF DESCRIPTION OF DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the invention in any way.

FIGS. 5A, 5B, and 5C each illustrate a table stored in a memory listing CGM sensor identifiers, usage limits, and usage counts according to embodiments provided herein.

DETAILED DESCRIPTION

Figure 1:
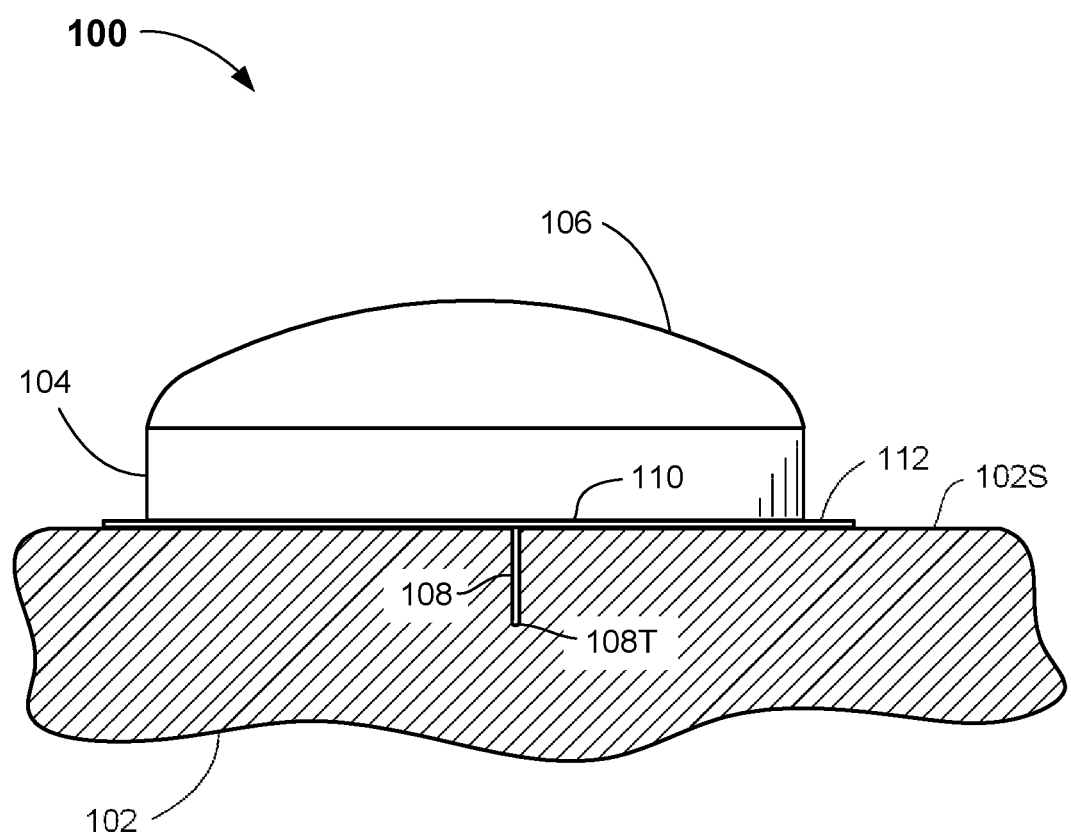
FIG. 1 illustrates a side elevation view of a continuous glucose monitoring (CGM) device that includes a sensor unit and a transmitter unit according to embodiments provided herein.

In order to more closely monitor and detect changes in a person's glucose concentration level, methods and systems for continuous glucose monitoring (CGM) have been developed. CGM methods and systems typically generate electrochemical glucose signals continuously during operation and perform glucose measurements/estimations based on the generated signals typically every few minutes.

CGM systems generally have a wearable portion (a CGM device) that is worn on the body and communicates (e.g., wirelessly) with an external device, such as a hand-held CGM receiver or other portable device, such as a smart phone executing a suitable application software program. The CGM device may be worn for several days or even one or two weeks before removal and replacement are required. The CGM device includes a sensor that is inserted (implanted) subcutaneously. The CGM device may also include analog circuitry coupled to the sensor and configured to bias the sensor and measure current signals generated by the inserted sensor, which is in contact with interstitial fluid. The CGM device may also include processing circuitry for determining glucose concentration levels based on measured current signals. The CGM device may further include electronic transmitter circuitry for communicating the determined glucose levels to an external device (e.g., a smart device or CGM receiver). The CGM device may be attached via, e.g., an adhesive, to the outer surface of the skin, such as to the abdomen, the back of the upper arm, or other suitable location.

CGM systems may provide frequent measurements of a user's glucose level without the need for each such measurement to be accompanied by the drawing of a blood sample, such as by finger sticks. CGM systems may still employ an occasional finger stick and the use of a blood glucose measuring (BGM) system, such as the Contour NEXT One® by Ascensia Diabetes Care AG of Basel Switzerland, for initiating calibration of the CGM system.

The CGM device of a CGM system may generally be worn for up to about two weeks, after which the sensor may be removed and replaced. In some embodiments, the entire CGM device may be removed and replaced. In other embodiments, the CGM device may include a replaceable sensor unit that may be detached by the user from a reusable transmitter unit of the CGM device. In such embodiments, only the sensor unit of the CGM device may need to be removed and replaced.

A CGM system may be configured to notify a user via, e.g., a display message and/or audible alert when a sensor has reached its usage limit and should be replaced. A CGM system may also prevent glucose measurements from occurring with such an EOL ("end-of-life") sensor. A user, however, may attempt to reuse an EOL sensor by removing the sensor from the user's skin surface and then reinserting it into the skin as if it were new. For numerous health and performance reasons, a CGM system configured to prevent this from occurring would be desirable. A user may also, however, have an issue with a CGM device during operation, such as, e.g., a problem with the CGM device adhering to the user's skin surface, wherein the user may have to remove and reinsert the sensor to correct the problem. It would also be desirable for a CGM system to be configured to distinguish this situation from the attempt to reuse an EOL sensor.

In accordance with one or more embodiments, devices, systems, and methods of detecting reinsertion of a CGM sensor and subsequent detection of meeting a usage limit thereof are provided herein, as will be explained in greater detail below in connection with FIGS. 1-5C.

FIG. 1 illustrates a wearable CGM device 100 inserted in skin 102 of a user according to one or more embodiments. CGM device 100 is configured to continuously monitor and provide periodic glucose readings (e.g., every 5 minutes or other suitable time interval). Although CGM device 100 is shown as partially dome shaped, CGM device 100 may have other shapes. CGM device 100 may include a sensor unit 104 and a transmitter unit 106. In some embodiments, sensor unit 104 and transmitter unit 106 may be integrally formed. In other embodiments, sensor unit 104 may be disposable, replaceable, and detachable from transmitter unit 106, which may be reusable with other sensor units. Sensor unit 104 and transmitter unit 106 may physically connect together via any suitable mechanical mechanism. When physically connected, sensor unit 104 and transmitter unit 106 may also be electrically coupled together so that data and control signals may be communicated and transmitted between electrical components in sensor unit 104 and transmitter unit 106. In some embodiments, initiation of communication between sensor unit 104 and transmitter unit 106 may be in response to physically connecting the two units together. In other embodiments, communication may be initiated by a command, such as a start command or the like. Communication between sensor unit 104 and transmitter unit 106 may be initiated in other suitable ways.

Sensor unit 104 may include a sensor 108, a portion of which is shown inserted through the user's skin 102. Sensor 108 may extend from sensor unit 104 through a baseplate 110 and may be configured to be at least partially located in interstitial fluid in a subcutaneous region of a user. Sensor 108 may be or may include an analyte sensor or an analyte sensor portion, such as at or near a sensor tip 108T. Sensor 108 may be inserted with an insertion device (not shown) having a sharpened needle or "introducer" that pierces the skin to introduce sensor 108 into a subcutaneous region of a user. Any suitable inserter device may be used.

Sensor unit 104 may also include an adhesive layer 112, which may be, e.g., a double-sided tape or pressure sensitive adhesive. One side of adhesive layer 112 may adhere to baseplate 110, while the other side of adhesive layer 112 may adhere to skin surface 102S of the user.

Transmitter unit 106 may include one or more electronic components that communicate with one or more electronic components within sensor unit 104 and with one or more external devices, as described in more detail below.

Figure 2:
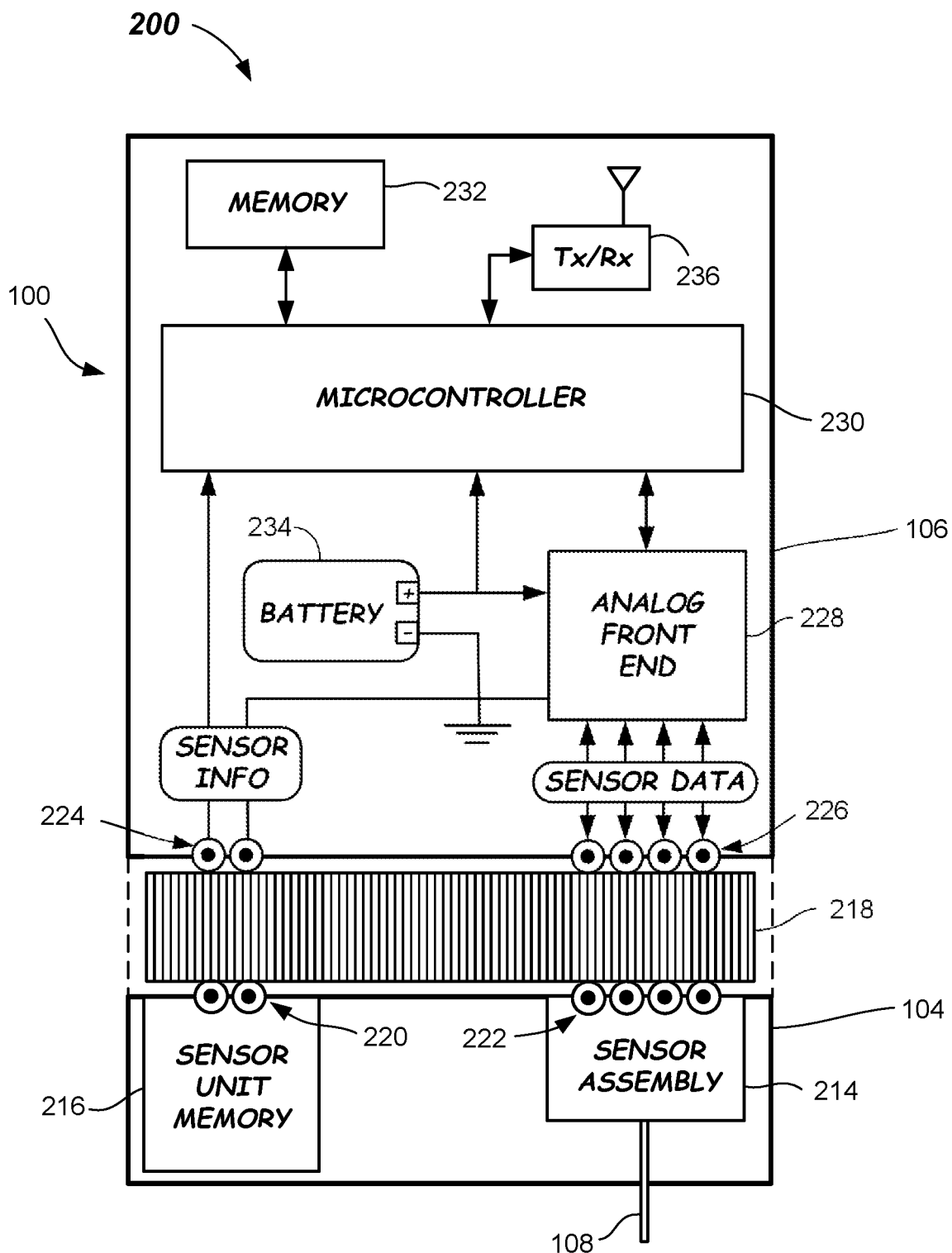
FIG. 2 illustrates a block diagram of the CGM device of FIG. 1 according to embodiments provided herein.

FIG. 2 illustrates a circuit component configuration 200 of CGM device 100 according to one or more embodiments. Sensor unit 104 may include a sensor assembly 214 and a sensor unit memory 216. Sensor assembly 214 may include sensor 108 and sensor circuitry (not separately shown) coupled to sensor 108. The sensor circuitry may apply at least one bias voltage to the analyte sensor portion of sensor 108, which may generate electrical signals while sensor 108 is in contact with the interstitial fluid. The sensor circuitry may also facilitate conducting electrical signals to and from sensor tip 108T of sensor 108 and/or other portions of sensor 108.

Sensor unit memory 216 may include a programmable read-only memory (PROM), an electrically erasable programmable read-only memory (EEPROM), a write once, read many memory (WORM), a static random access memory (SRAM), synchronous dynamic random-access memory (SDRAM), a physically unclonable function (PUF) (which may serve as a unique identifier), and/or NOR and NAND flash memories. Other suitable types of sensor memory circuitry may be used for sensor unit memory 216.

In some embodiments, sensor unit memory 216 may include a radiation hardened memory (rad-hard memory) or may be located within a rad-hard package that retains information (e.g., data) stored therein when the package and/or memory is exposed to radiation used to sterilize sensor unit 104.

Sensor unit memory 216 may store sensor information specific to that individual sensor unit and to components therein. For example, the sensor information may include a sensor unit identifier (e.g., a serial number of the sensor unit) and a corresponding usage limit. The identifier may be unique or at least partially unique (e.g., a manufacturer may not reuse the same identifier within a certain period of time or certain geographical region such that a user inserting a sensor with an identifier identical to a different recently-inserted sensor is highly unlikely). The sensor information may also include, e.g., one or more of the following parameters:

a) electrode sensitivity slope;
b) manufacturing date;
c) an expiration (shelf-life) date;
d) batch or lot number;
e) security code; and/or
f) memory device version.

Other parameters and/or sensor information may be stored in sensor unit memory 216. Additionally or alternatively, some or all of the above parameters and/or sensor information may be encoded in a barcode or the like of sensor unit 104, CGM device 100, and/or packaging thereof.

In some embodiments, electrical data and control signals and power may be transmitted between sensor unit 104 and transmitter unit 106 via a connector 218, electrical contact pads 220 and 222 of sensor unit 104, and electrical contact pads 224 and 226 of transmitter unit 106 when sensor unit 104 and transmitter unit 106 are physically connected together.

Transmitter unit 106 may include an analog front end 228, a microcontroller 230 (or other similar processing resource), a memory 232, a power source such as a battery 234, and a wireless transmitter 236. In some embodiments, transmitter unit 106 may include a local display (not shown) for displaying information such as glucose concentration information, sensor EOL, sensor expiration, etc., without use of an external device.

Analog front end 228 may be configured to drive sensor assembly 214 and/or process sensor data generated by sensor assembly 214 and sensor 108. For example, analog front end 228 may be configured to apply a bias voltage to sensor assembly 214 and to measure resulting current flow through sensor assembly 214. Analog front end 228 in conjunction with sensor assembly 214 may apply the bias voltage to inserted sensor 108 located in interstitial fluid and may measure the resulting current, which is proportional to the glucose concentration. Analog front end 228 may perform other, fewer, or more functions.

Microcontroller 230 may be coupled to analog front end 228, memory 232, battery 234, wireless transmitter 236, and possibly other circuitry (not shown). Microcontroller 230 may include a processor such as, e.g., a microprocessor or other suitable processing circuitry, for processing sensor data generated by sensor assembly 214 and/or analog front end 228 and for detecting sensor reinsertion as described herein. Microcontroller 230 may also include, e.g., analog-to-digital converters for converting, e.g., analog current signals generated by sensor assembly 214 into digital current signals. Microcontroller 230 may further store digital current signal values in memory 232 and/or calculate or estimate glucose concentration levels based at least in part on the digital current signals. Microcontroller 230 may still further detect whether a sensor of a CGM device has been reinserted and whether a reinserted sensor has met its usage limit (e.g., has reached its EOL), as described in more detail below in connection with FIGS. 4 and 5. Microcontroller 230 may perform other suitable functions.

Microcontroller 230 and/or other circuitry within transmitter unit 106 may be configured to electrically couple to and communicate with sensor unit memory 216. Microcontroller 230 may receive data stored in sensor unit memory 216, including the identifier of sensor unit 104, along with other of the above-described sensor information related to one or more parameters of one or more components of sensor unit 104. In some embodiments, a signal (e.g., a pull signal) may be transmitted from microcontroller 230 to sensor unit memory 216 to cause sensor unit memory 216 to transmit the data without user input. Thus, sensor unit memory 216 may automatically transmit the data to microcontroller 230 in response to connection of sensor unit 104 to transmitter unit 106. Alternatively, the transmission of sensor information from sensor unit memory 216 to microcontroller 230 may occur by way of a prompt, such as from the external device, or in any other suitable manner.

Microcontroller 230 may store the information received from sensor unit memory 216 in memory 232 and may use the information when calculating analyte concentrations, detecting whether sensor 108 has been reinserted (and if so, whether sensor 108 has met its usage limit), and performing other functions. In other embodiments, the information may remain in sensor unit memory 216 and may be accessed during CGM processing as needed by microcontroller 230 or other circuitry.

Additionally or alternatively, microcontroller 230 and memory 232 may receive sensor information from one or more barcodes or the like of sensor unit 104, CGM device 100, and/or packaging thereof via scanning by an external device in communication with transmitter unit 106.

Memory 232 may include computer program code stored therein that, when executed by the processor in microcontroller 230, causes CGM device 100 to perform various functions and/or to communicate with one or more external devices, such as a CGM receiver or a smart device (e.g., a smart phone or tablet) executing a CGM application software program that may calculate and/or display glucose levels and related data.

Memory 232 may also be configured to store a plurality of sensor unit identifiers corresponding to previously-used sensor units in those embodiments wherein sensor unit 104 is replaceable and detachable from transmitter unit 106, which is reusable with other sensor units. In some embodiments, identifiers corresponding to previously-used sensor units may be stored in, e.g., cloud-based storage and may be downloaded to memory 232 as needed.

Memory 232 may further include computer program instructions stored therein that, when executed by the processor in microcontroller 230, causes CGM device 100 to, in part, determine whether the identifier stored in sensor unit memory 216 matches any previously-stored identifier in memory 232, and determine whether sensor 108 has met its predetermined usage limit in response to determining that the identifier stored in sensor unit memory 216 matches a previously-stored identifier in memory 232.

In some embodiments, memory 232 may be a radiation hardened memory (rad-hard memory) or may be located within a rad-hard package, similar or identical to sensor unit memory 216. Memory 232 may be a non-volatile memory, and may include, but is not limited to, an electrically programmable read-only memory (EPROM), an electrically erasable programmable read-only memory (EEPROM), and/or a flash memory (e.g., a type of EEPROM in either of the NOR or NAND configurations). Other types of suitable memory may be used for memory 232, including reading data from an Internet storage location, which may be cloud based.

Battery 234 may be located in and provide power to transmitter unit 106. In some embodiments, battery 234 may be rechargeable. Upon connection of sensor unit 104 to transmitter unit 106, battery 234 may also provide power to sensor unit 104. Providing power to sensor unit 104 may, in some embodiments, initiate communication between sensor unit 104 and transmitter unit 106, initiate detection of sensor insertion, and/or initiate CGM processing. In some embodiments, power may be provided to sensor unit 104 via analog front end 228. In other embodiments, battery 234 may be located within sensor unit 104 instead of transmitter unit 106, and in still other embodiments, sensor unit 104 and transmitter unit 106 may each have their own battery. Examples of battery 234 include flexible lithium polymer batteries, coin cell batteries such as lithium manganese, silver oxide, and alkaline coin batteries (e.g., CR 2032, SR516, and LR60 type coin batteries), or the like. Other power source/battery types may be used.

In some embodiments, microcontroller 230 may transmit electrical signals, glucose concentration information, and/or other information to one or more external devices via wireless transmitter 236. In some embodiments, microcontroller 230 may receive electrical signals, instructions, data, and/or other information from one or more external devices via wireless transmitter 236.

Figure 3:
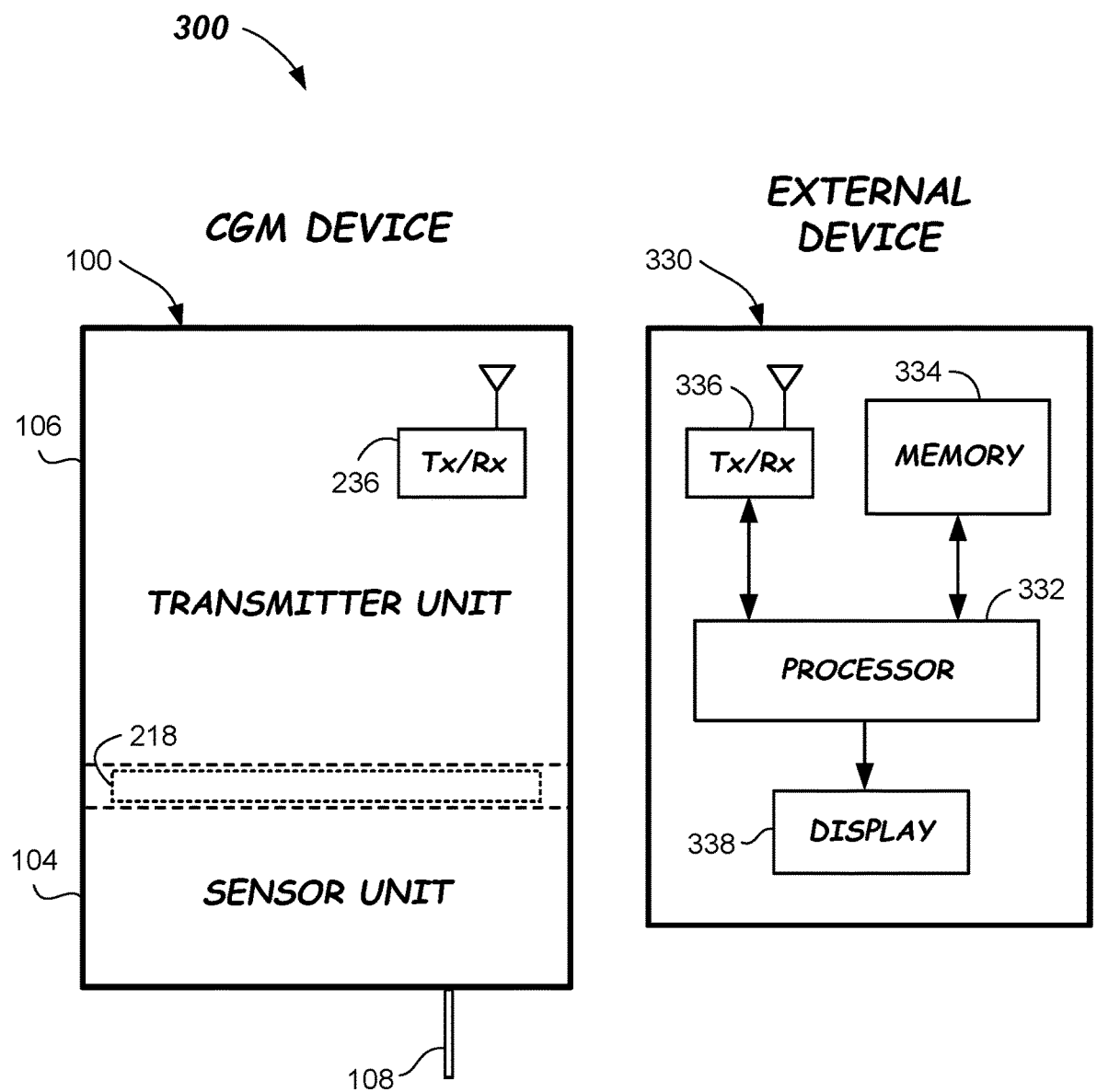
FIG. 3 illustrates a block diagram of a CGM system that includes a CGM device and an external device according to embodiments provided herein.

FIG. 3 illustrates a CGM system 300 according to one or more embodiments. CGM system 300 includes CGM device 100 and an external device 330. External device 330 may be, e.g., a dedicated CGM receiver or a smart device executing a CGM application software program. External device 330 may include a processor 332, a memory 334, a wireless transmitter 336, and a display 338, wherein processor 332 is coupled to each of memory 334, wireless transmitter 336, and display 338, each of which may be any suitable device or component configured to perform at least some or all of the CGM related functions described herein. External device 330 may include other circuit components as well.

External device 330 and CGM device 100 may be communicatively coupled to each other via their respective wireless transmitters 236 and 336. Such wireless communication may occur via, e.g., any suitable standards-based communications protocols such as the Bluetooth® communications protocol. In some embodiments, wireless communication between external device 330 and CGM device 100 may occur via near-field communication (NFC), radio frequency (RF) communication, infra-red (IR) communication, optical communication, or any other suitable type of wireless communication. In some embodiments, external device 330 and CGM device 100 may additionally or alternatively communicate via one or more wired connections. In some embodiments, a security code matching a security code stored in sensor unit memory 216 may need to be input by the user into external device 330 before communication can be initiated between transmitter unit 106 and sensor unit 104 and/or between CGM device 100 and external device 330.

In some embodiments, at least some of the sensor information stored in sensor unit memory 216 of sensor unit 104 may be transferred to memory 334 of external device 330 via wireless transmitter 236 of CGM device 100 and wireless transmitter 336 of external device 330. The received sensor information may be processed by processor 332 and displayed on display 338. In some embodiments, some or all of the processing to determine glucose levels may be performed by processor 332, instead of by transmitter unit 106, and may be displayed on display 338. Other sensor information received by external device 330 may be displayed on display 338 to a user of CGM device 100. For example, the date of manufacture and/or an expiration date of sensor 108 and/or sensor unit 104 may be provided to the user, which may enable the user to determine whether sensor unit 104 and/or CGM 100 should be used.

In some embodiments, some or all of the processing to detect reinsertion of sensor 108 and to determine whether a reinserted sensor has met its usage limit as described herein in connection with transmitter unit 106 may be performed by external device 330, instead of by transmitter unit 106. In particular, e.g., memory 334 of external device 330 may be configured to store a plurality of sensor unit identifiers corresponding to previously-used CGM devices (in those embodiments wherein sensor unit 104 and transmitter unit 106 are integrally formed) or previously-used sensor units (in those embodiments wherein sensor unit 104 is replaceable and detachable from transmitter unit 106, which is reusable with other sensor units). Also, in some embodiments, sensor information/data may be stored in cloud-based storage and retrieved therefrom to memory 334 by external device 330 as needed. In other embodiments, some or all sensor information/data may be encoded in one or more barcodes or the like attached to sensor unit 104, CGM device 100, and/or packaging thereof and retrieved therefrom to memory 334 by a scanner (not shown) of external device 330.

In those embodiments where sensor unit 104 and transmitter unit 106 are integrally formed, requiring CGM device 100 to be removed and replaced upon EOL of sensor 108, an identifier (e.g., serial number) of that CGM 100 may be stored in either sensor unit memory 216 or memory 232 of transmitter unit 106. In some embodiments, a CGM device 100 having an integrally formed sensor unit 104 and transmitter unit 106 may have only a single memory (e.g., sensor unit memory 216 and memory 232 may be combined into a single memory device, which may still be referred to as a sensor unit memory), wherein the identifier may be stored. The CGM identifier may be transferred to memory 334 of external device 330 in response to insertion or reinsertion of CGM device 100 into the skin of a user.

Memory 334 of external device 330 may include computer program instructions, which may be part of a CGM application software program stored therein, that when executed by processor 332 causes processor 332 to, in part, determine whether the identifier stored in CGM device 100 matches any previously-stored identifier in memory 334, and determine whether sensor 108 has met its predetermined usage limit in response to determining that the identifier stored in CGM device 100 matches a previously-stored identifier in memory 334.

Figure 4:
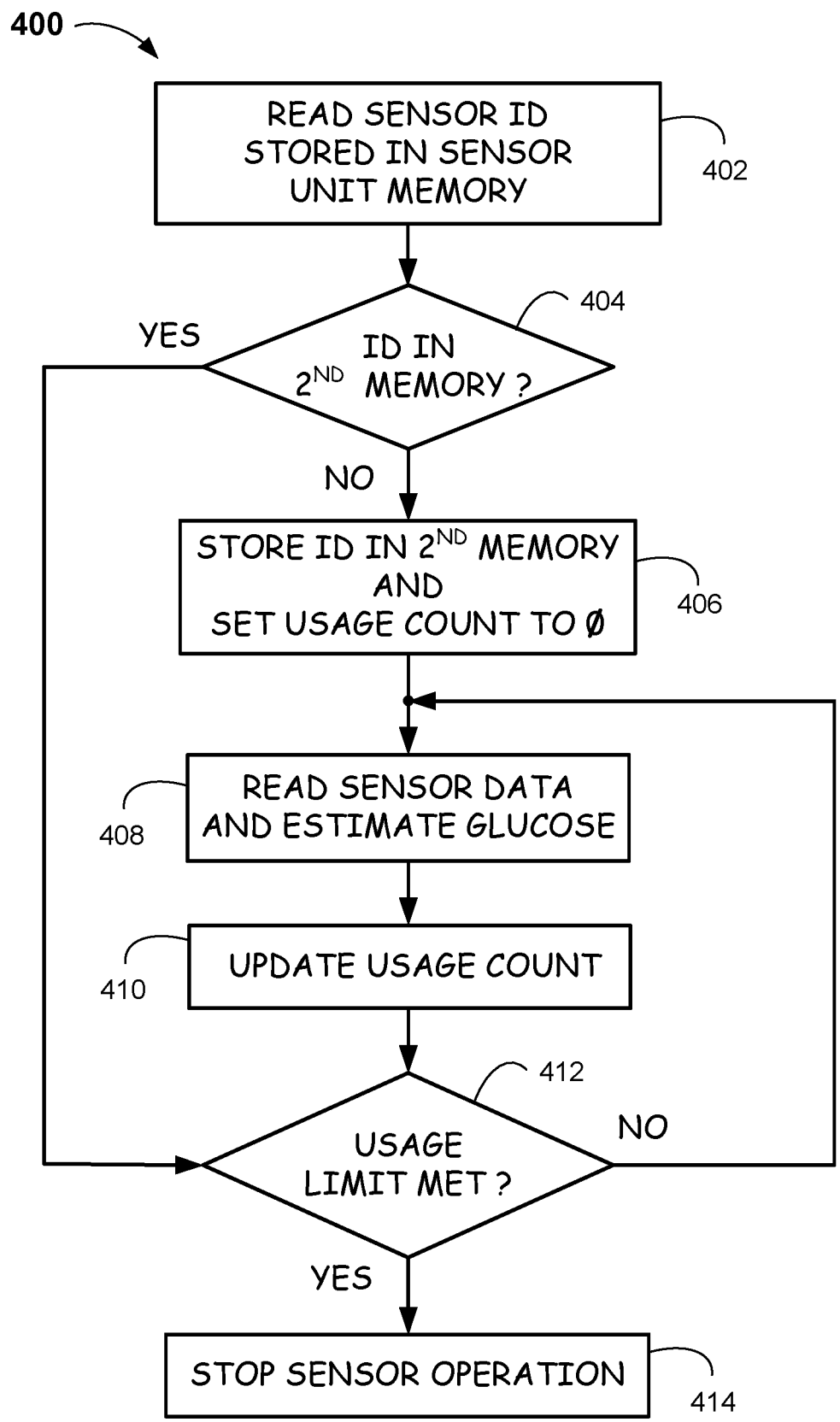
FIG. 4 illustrates a flowchart of a method of detecting reinsertion of a CGM sensor according to embodiments provided herein.

FIG. 4 illustrates a method 400 of detecting whether a sensor of a CGM device has been reinserted and whether a reinserted sensor has met its usage limit (e.g., has reached its EOL). At process block 402, method 400 may begin by reading or receiving an identifier of a sensor via a processor executing computer instructions in response to activation of CGM. Activation of CGM may occur in response to a power-up of the sensor unit, a user-entered command, or any other suitable manner of initiating CGM in response to insertion of a sensor into the skin of a user. The identifier may be, e.g., stored in a sensor unit memory of a sensor unit and/or encoded in a barcode attached to, e.g., the sensor unit, the CGM device, or packaging thereof. In some embodiments, the sensor may be sensor 108 of sensor unit 104 of CGM device 100, which may be part of CGM system 300 (see FIGS. 1-3). The sensor unit memory may be sensor unit memory 216 and the processor may be a processor of microcontroller 230 of CGM device 100 or processor 332 of external device 330, which is in communication with CGM device 100.

Method 400 may proceed to decision block 404 to determine whether the sensor identifier matches any identifier of a previously-inserted sensor that is stored in a second memory. The second memory may be, e.g., memory 232 located in transmitter unit 106 of CGM device 100 or memory 334 of external device 330. In some embodiments, the second memory may include a table as shown in FIG. 5A.

FIG. 5A illustrates a stored table 500A listing sensor identifiers and corresponding usage limits and usage counts of previously-inserted sensors. For example, a most recent previously-inserted sensor may have an identifier (e.g., a serial number) of 12345678, a usage limit of 4,032, and a usage count of 4,032 (indicating that the sensor has reached its usage limit). In some embodiments, the usage limit may represent a predetermined total number of glucose readings permitted with the sensor. For example, a 14-day sensor performing a glucose reading every 5 minutes would have a usage limit of 4,032 (12 readings per hour×24 hours per day×14 days). Similarly, a 10-day sensor performing a glucose reading every 5 minutes would have a usage limit of 2,880 (12 readings per hour×24 hours per day×10 days).

If the determination is "YES" at decision block 404, indicating that the sensor identifier matches a previously-stored identifier in the second memory and thus is presumed to have been reinserted and is being reused, method 400 may proceed to decision block 412, where a usage count corresponding to that sensor identifier is checked to determine whether it meets the usage limit corresponding to that sensor identifier, which would indicate that the sensor has reached its EOL.

If the determination is "NO" at decision block 404, indicating that the sensor identifier is not in the second memory, the sensor is presumed to be new, and method 400 may proceed to process block 406.

At process block 406, the second memory is updated to include the new identifier, and the usage count of that sensor (presumed to be new) corresponding to the newly stored identifier is set to zero. For example, referring to FIG. 5B, which illustrates a stored table 500B of sensor identifiers and corresponding usage limits and usage counts of previously-inserted sensors, assume the newly-inserted sensor has an identifier of 46813527, which did not match any of the previously-stored identifiers. In response, the second memory is updated with sensor identifier 46813527 along with its usage limit of 4,032 (which may also have been read from the sensor unit memory), and its corresponding usage count is set to zero, as shown in FIG. 5B.

Method 400 may then proceed to process block 408, where data from the sensor is read and a glucose reading is determined/estimated based on the sensor data, as described above.

From process block 408, method 400 may proceed next to process block 410, wherein the usage count corresponding to the sensor identifier in the second memory may be updated based on the last glucose reading performed at process block 408. For example, referring to FIG. 5C, which illustrates a stored table 500C of sensor identifiers and corresponding usage limits and usage counts, assume sensor identifier 46813527 represents the currently-inserted sensor just having performed a glucose reading. The usage count corresponding to sensor identifier 46813527 may be incremented from 3,679 to 3,680.

Method 400 may then proceed to decision block 412 to determine whether the sensor's usage limit has been met (indicating that the sensor has reached its EOL) and should no longer be used. For example, referring again to FIG. 5C, the method, having arrived at decision block 412 from either decision block 404 or process block 410, determines whether the usage count (e.g., 3,679 or 3,680) meets the usage limit (e.g., 4,032) corresponding to sensor identifier 46813527.

If the determination is "NO" at decision block 412, indicating that the sensor's usage limit has not been met and thus can still be used, method 400 may return to process block 408, where another glucose reading may be performed at the CGM system's predetermined measurement interval (e.g., every 5 minutes).

If the determination is "YES" at decision block 412, indicating that the sensor's usage limit has been met and thus the sensor should no longer be used, method 400 may proceed to process block 414.

At process block 414, operation of the sensor is stopped. That is, a processor of CGM device 100 and/or external device 330 may signal the user with an error message or audible alert via an I/O device (e.g., a display and/or sound device) of CGM device 100 and/or external device 330 that glucose monitoring is halted and the sensor needs to be replaced. In some embodiments, CGM device 100 and/or external device 330 may prevent the sensor from operating and/or may prevent processing of any signals received from the sensor.

In alternative embodiments, tables 500A, 500B, and 500C may each include a fourth column for indicating any error, defect, failure, or malfunction of a sensor, replaceable sensor unit, or replaceable CGM device detected during power-up or use thereof that would prohibit the continued use of that sensor, replaceable sensor unit, or replaceable CGM device, regardless of whether or not the sensor's usage limit had been met. In those alternative embodiments, an alternative decision block 412 may determine whether any such error, defect, failure, or malfunction has occurred (as indicated in the fourth column) in addition to determining whether the sensor's usage limit has been met. In response to determining that such an error, defect, failure, or malfunction had occurred, or that the sensor's usage limit had been met, alternative method 400 would proceed to process block 414 to stop operation of the sensor. In response to determining that no error, defect, failure, or malfunction had occurred, and that the sensor's usage limit had not been met, alternative method 400 would proceed to process block 408.

Note that in some embodiments, tables 500A, 500B, and 500C may store only a small number of identifiers (e.g., 5-10) corresponding to the most recently-used sensors. In some embodiments, tables 500A, 500B, and 500C may be stored in memory 232 of transmitter unit 106, while in other embodiments, tables 500A, 500B, and 500C may be stored in memory 334 of external device 330 or in a cloud-based memory.

Also note that some embodiments, or portions thereof, may be provided as a computer program product or software that may include a machine-readable medium having non-transient instructions stored thereon, which may be used to program a computer processor, system, controller, or other electronic device to perform a process or method described herein in accordance with one or more embodiments.

While the disclosure is susceptible to various modifications and alternative forms, specific method and apparatus embodiments have been shown by way of example in the drawings and are described in detail herein. It should be understood, however, that the particular methods and apparatus disclosed herein are not intended to limit the disclosure or the claims.

What is claimed is:

1. A continuous glucose monitoring (CGM) system, comprising:
    a CGM device comprising a wireless transmitter, a disposable CGM sensor, and a sensor barcode attached to the disposable CGM sensor,
        wherein the disposable CGM sensor is configured to detect when the disposable CGM sensor is inserted into a user's skin prior to sensing a user's glucose levels and periodically generate electrical signals to sense the user's glucose levels,
        wherein a sensor identifier identifying the disposable CGM sensor of the CGM device and a security code are encoded in the sensor barcode; and
    an external device comprising a memory configured to store a plurality of sensor identifiers, a wireless receiver, and a processor in communication with the memory and the wireless receiver wherein the processor is configured to:
        request a user to scan the sensor barcode via the external device when the disposable CGM sensor is inserted into the user's skin and prior to sensing the user's glucose levels;
        in response to the user scanning the sensor barcode via the external device, receive the sensor identifier and the security code encoded in the sensor barcode;
        detect reinsertion of the disposable CGM sensor into the user's skin by determining whether the sensor identifier matches one or more of the plurality of sensor identifiers stored in the memory by comparing the sensor identifier to one or more of the plurality of sensor identifiers,
            wherein, when the sensor identifier of the disposable CGM sensor inserted into the user's skin does not match any of the plurality of sensor identifiers stored in the memory, cause the sensor identifier to be stored in the memory and set a usage count corresponding to the sensor identifier to zero,
            wherein, when the sensor identifier of the disposable CGM sensor inserted into the user's skin matches at least one of the plurality of sensor identifiers stored in the memory, determine whether the usage count corresponding to the sensor identifier is less than a predetermined usage limit corresponding to the sensor identifier prior to sensing the user's glucose levels;
        request the user to input the security code into the external device,
            wherein, when a code input by the user does not match the security code, prevent communication between the disposable CGM sensor and the wireless transmitter;
        responsive to receiving, via the wireless receiver, a glucose level from the CGM device, increase the usage count corresponding to the sensor identifier by one increment;
        determine whether the usage count has reached the predetermined usage limit;
        responsive to a determination that the usage count has reached the predetermined usage limit, cause the CGM device to cease generating the electrical signals; and
        notify the user that glucose monitoring is halted and the disposable CGM sensor requires replacement.

2. The CGM system of claim 1, wherein the memory is also configured to store the predetermined usage limit and the usage count for each of the plurality of sensor identifiers.

3. The CGM system of claim 1, wherein the wireless transmitter is integrally formed in the CGM device.

4. The CGM system of claim 1, wherein the wireless transmitter is detachable from the CGM device such that the wireless transmitter is replaceable and reusable with other sensor units.

5. The CGM system of claim 1, wherein the processor is further configured to receive sensor data from the CGM device via the wireless receiver and estimate the glucose level.

6. The CGM system of claim 1, wherein the processor is further configured to:
    monitor sensor activity for an indication of at least one of an error, defect, failure, or malfunction of the CGM device; and
    responsive to receiving the indication, determine whether the error, the defect, the failure, or the malfunction of the CGM device occurred.

7. The CGM system of claim 6, wherein the processor is further configured to:
    responsive to determining that the error, the defect, the failure, or the malfunction has occurred, cause the CGM device to cease generating the electrical signals.

8. The CGM system of claim 6, wherein the processor is further configured to:
    generate a message indicating that the error, the defect, the failure, or the malfunction has occurred, the glucose monitoring is halted, and the disposable CGM sensor requires replacement.

9. The CGM system of claim 6, wherein the processor is further configured to:
    responsive to determining that the error, the defect, the failure, or the malfunction has not occurred and that the usage count has not been reached, cause the CGM device to continue generating the electrical signals.

10. A method of detecting reinsertion of a disposable continuous glucose monitoring (CGM) sensor of a CGM device, the method comprising:
    detecting when the disposable CGM sensor of the CGM device is inserted into a user's skin prior to activation of CGM, the disposable CGM device further comprising:
    a wireless transmitter and a sensor barcode attached to the disposable CGM sensor, wherein a sensor identifier identifying the disposable CGM device and a security code are encoded in the sensor barcode; requesting, via a processor of an external device, a user to scan the sensor barcode via the external device when the disposable CGM sensor is inserted into the user's skin and prior to sensing a user's glucose level, wherein the external device comprises: a memory configured to store a plurality of sensor identifiers; a wireless receiver; and the processor in communication with the memory and the wireless receiver; receiving the sensor identifier of the disposable CGM sensor and the security code encoded in the sensor barcode in response to the user scanning the sensor barcode and in response to the activation of the disposable CGM sensor; detecting reinsertion of the disposable CGM sensor into the user's skin by determining whether the sensor identifier matches any of the plurality of sensor identifiers in the memory of the external device prior to sensing a user's glucose levels; storing the sensor identifier in the memory in response to the sensor identifier not matching any previously-stored identifier in the memory and set a usage count corresponding to the sensor identifier to zero;

requesting the user to input the security code encoded in the sensor barcode into the external device; in response to the user inputting a code that does not match the security code, preventing communication between the disposable CGM sensor and the wireless transmitter of the CGM device; responsive to receiving, via the wireless receiver, a glucose level from the CGM device, increasing the usage count corresponding to the sensor identifier by one increment; determining whether the disposable CGM sensor has met a predetermined usage limit prior to sensing the user's glucose levels in response to the sensor identifier matching any of the plurality of sensor identifiers in the memory; stopping operation of the CGM by ceasing generation of electrical signals in response to determining that the disposable CGM sensor has met the predetermined usage limit; and notifying the user that glucose monitoring is halted and the disposable CGM sensor requires replacement.

11. The method of claim 10, further comprising setting a usage count corresponding to the identifier to zero in the memory in response to storing of the identifier.

12. The method of claim 10, further comprising:
receiving sensor data from the disposable CGM sensor and via the wireless receiver; and estimating the glucose level in response to storing the sensor identifier.

13. The method of claim 12, further comprising updating the usage count of the disposable CGM sensor in response to estimating the glucose level.

14. The method of claim 13, wherein determining whether the disposable CGM sensor has met the predetermined usage limit also occurs in response to updating the usage count.

15. The method of claim 14, wherein receiving the sensor data and estimating the glucose level occurs in response to determining that the disposable CGM sensor has not met the predetermined usage limit.

16. The method of claim 10, further comprising determining whether the disposable CGM sensor has an indication of error, defect, failure, or malfunction in response to the sensor identifier matching a previously-stored identifier of the plurality of sensor identifiers in the memory.

17. The method of claim 16, further comprising stopping the operation of the CGM in response to determining that the disposable CGM sensor has the indication of the error, the defect, the failure, or the malfunction.

18. A continuous glucose monitoring (CGM) system, comprising:
a CGM device comprising a wireless transmitter, a disposable CGM sensor, and a sensor barcode attached to the disposable CGM sensor, wherein the disposable CGM sensor is configured to detect when the disposable CGM sensor is inserted into a user's skin prior to sensing a user's glucose levels and periodically generate electrical signals to sense the user's glucose levels, wherein a sensor identifier identifying the disposable CGM sensor of the CGM device and a security code are encoded in the sensor barcode; and an external device comprising a memory configured to store a plurality of sensor identifiers, a wireless receiver, and one or more non-transitory computer-readable media comprising computer-executable instructions that, when executed by at least one processor, perform a method, comprising: requesting a user to scan the sensor barcode via the external device when the disposable CGM sensor is inserted into the user's skin and prior to sensing the user's glucose levels; in response to the user scanning the sensor barcode via the external device, receiving the sensor identifier and the security code encoded in the sensor barcode; detecting reinsertion of the disposable CGM sensor into the user's skin by determining whether the sensor identifier matches one or more of the plurality of sensor identifiers stored in the memory by comparing the sensor identifier to one or more of the plurality of sensor identifiers, wherein, when the sensor identifier of the disposable CGM sensor inserted into the user's skin does not match any of the plurality of sensor identifiers stored in the memory, causing the sensor identifier to be stored in the memory and set a usage count corresponding to the sensor identifier to zero, wherein, when the sensor identifier of the disposable CGM sensor inserted into the user's skin matches at least one of the plurality of sensor identifiers stored in the memory, determining whether the usage count corresponding to the sensor identifier is less than a predetermined usage limit corresponding to the sensor identifier prior to sensing the user's glucose levels;

requesting the user to input the security code into the external device, wherein, when a code input by the user does not match the security code, preventing communication between the disposable CGM sensor and the wireless transmitter; responsive to receiving, via the wireless receiver, a glucose level from the CGM device, increasing the usage count corresponding to the sensor identifier by one increment; determining whether the usage count has reached the predetermined usage limit; responsive to a determination that the usage count has reached the predetermined usage limit, causing the CGM device to cease generating the electrical signals; and notifying the user that glucose monitoring is halted and the disposable CGM sensor requires replacement.

19. The continuous glucose monitoring (CGM) system of claim 18, wherein the CGM device is further configured to estimate the glucose level based at least in part on a digital current signal.

20. The continuous glucose monitoring (CGM) system of claim 18, wherein the glucose level received from the CGM device via the wireless transmitter is received as a digital current signal.

21. The continuous glucose monitoring (CGM) system of claim 18, wherein the CGM device further comprises a sensor unit memory configured to store the sensor identifier associated with the CGM device.

\* \* \* \* \*